S. L. GOLDSBROUGH.
AUTOMATIC TEMPERATURE CONTROL FOR ELECTRIC IRONS.
APPLICATION FILED DEC. 29, 1917.
1,284,649.
Patented Nov. 12, 1918.
2 SHEETS—SHEET 1.
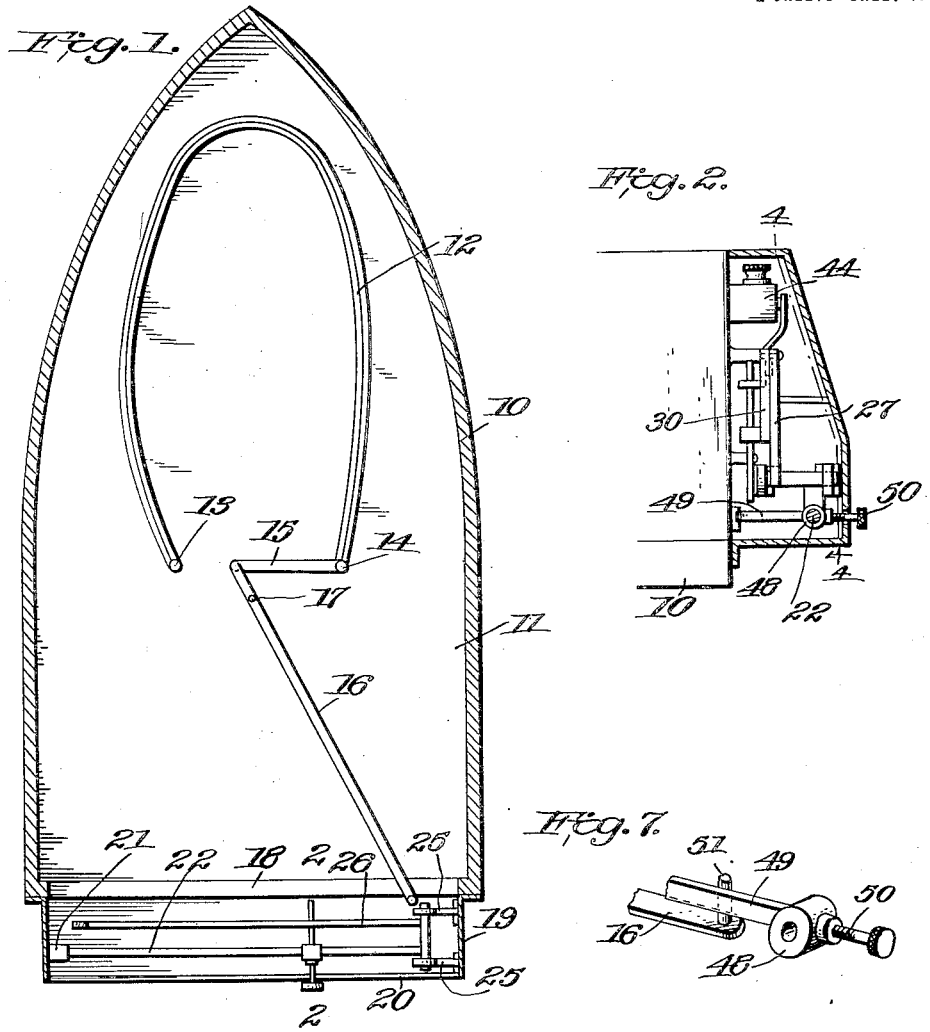
WITNESSES
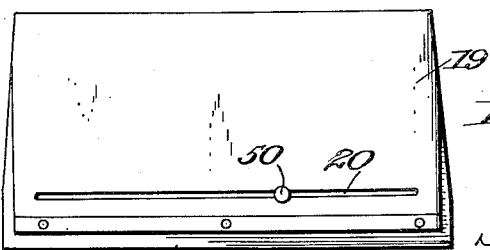
INVENTOR,
Shirley L. Goldsbrough,
BY Richard B. Owen,
ATTORNEY.

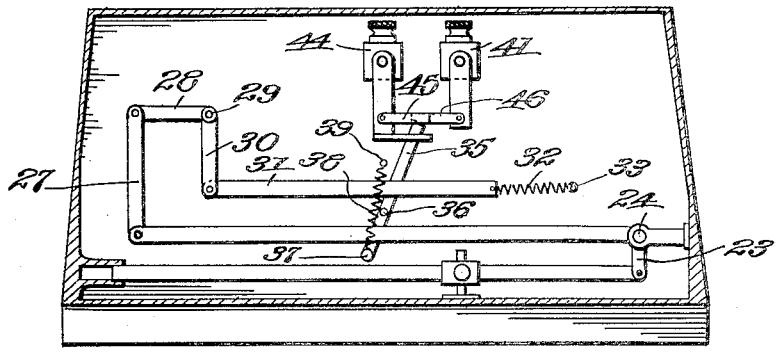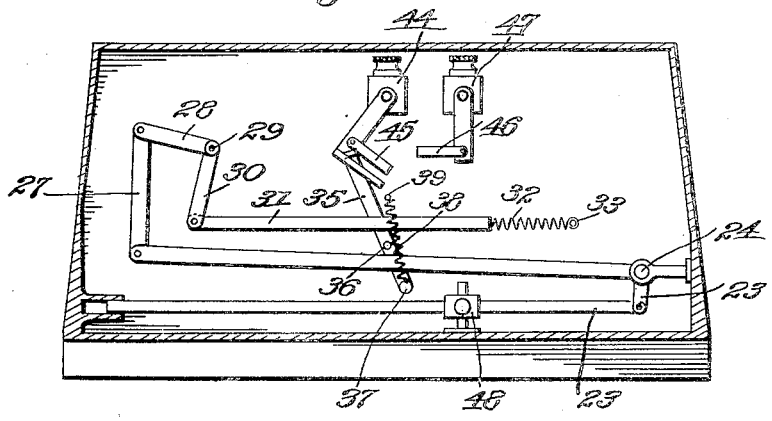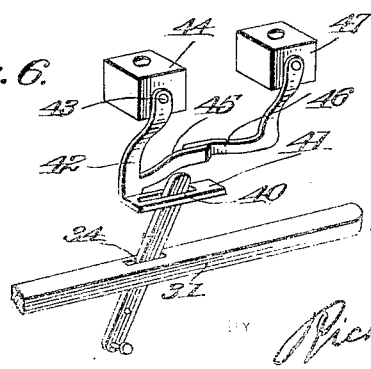

UNITED STATES PATENT OFFICE.

SHIRLEY L. GOLDSBROUGH, OF SALT LAKE CITY, UTAH.

AUTOMATIC TEMPERATURE CONTROL FOR ELECTRIC IRONS.

1,284,649.   Specification of Letters Patent.   Patented Nov. 12, 1918.

Application filed December 29, 1917. Serial No. 209,488.

*To all whom it may concern:*

Be it known that I, SHIRLEY L. GOLDSBROUGH, a citizen of the United States, residing at Salt Lake City, in the county of Salt Lake and State of Utah, have invented certain new and useful Improvements in Automatic Temperature Controls for Electric Irons, of which the following is a specification.

This invention has relation to temperature regulators for electric flatirons, and has for an object to provide a device of this character embodying an expansible element associated with a circuit closer and an adjustable stop member whereby to discontinue the supply of current to the heating element of the iron when the temperature thereof has reached a predetermined point.

Another object of this invention is to provide a temperature regulator for flatirons, including an electric switch in the circuit, an expansible element located within the flatiron, a member movable along a scale to limit the maximum temperature of the iron, with a linkage connection between said element and the expansible member to control the operation of the switch whereby to discontinue the supply of current to the heating element upon engagement of the adjustable element.

A still further object of the invention is to provide a temperature regulator for flatirons having the characteristics above set forth, simple in construction, comprising few parts, thereby insuring positiveness of action, and at the same time permitting the manufacture of the apparatus in connection with a flatiron at low cost.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear;—

Figure 1, is a view in section taken through an electric flatiron of conventional type illustrating the association therewith of the parts of my invention.

Fig. 2, is a vertical section taken on the line 2—2 of the preceding figure.

Fig. 3, is a view of the casing containing the elements in rear elevation.

Fig. 4, is a vertical transverse section taken on the line 4—4 of Fig. 2.

Fig. 5, is a view similar to the immediately preceding figure illustrating the parts in another position.

Fig. 6, is a detail perspective view illustrating the circuit controlling switch, and Fig. 7, is a detail view in perspective of the adjustable element.

With reference to the drawings 10 indicates generally an electric flatiron of conventional type, the bottom plate of which is indicated at 11. Mounted interiorly of the flatiron adjacent the forward end thereof is an expansible element indicated at 12 in the nature of a pair of strips of dissimilar metal having different co-efficients of expansion, and rigidly secured together so as to prevent relative movement, one end of the expansible element being pivotally mounted upon the bottom plate of the iron and indicated at 13, the opposite end being pivotally connected as at 14 to a transversely extending link 15. The opposite terminal of said link 15 is pivotally connected to a lever 16 the fulcrum of which, indicated at 17 is located closely adjacent the point of connection thereof with said link, while the opposite end is extended through a horizontal, transversely extending slot 18 in the rear wall of the flatiron.

Mounted upon said rear walls of the flatiron is a casing 19 designed to contain the operating parts of my invention, the same being formed at its face with a longitudinally extending slot 20 in substantial registration with the slot 18 described above.

Formed upon one end wall of said casing 19, and preferably the left hand end wall as illustrated in the drawings, is a bearing member 21 designed to receive one end of a slidably mounted rod 22 to extend transversely of the flatiron, the opposite end of said rod being pivotally connected to a depending arm 23 of a longitudinally extending rock shaft 24, the terminals of which are journaled in brackets 25 extending inwardly from the right hand wall of said casing 19. Extending horizontally from said shaft 24 and toward the left hand end of the casing is an arm 26 considerably longer than the above mentioned arm 23, having pivotally connected to its free end an upwardly extending link 27. The upper end of said link 27 is pivotally connected to an arm 28 of a bell crank, the same being pivotally mounted at 29 upon a stud extending from the rear wall of the flatiron, while the other arm 30 thereof depends for pivotal connection to a transversely extending bar 31. The opposite end of the said bar 31 is connected to a coil spring 32, the opposite end of which is secured to a pin 33 which extends from the rear wall of the casing 19.

The bar 31 is formed at a point substantially intermediate its ends with an elongated opening or slot 34 through which extends an operating lever therefor indicated at 35, the same being fulcrumed at 36. The lower end of the lever 35, or the end thereof opposite its end which projects through the slot 34 is provided with a laterally extending pin 37 to which is connected one end of a light coil spring 38, the opposite end of said spring extending upwardly for connection to a pin 39 which extends from the rear wall of the casing 19. The extreme upper end of the operating lever 35 projects through an opening 40 of a bar 41 formed upon the lower end of a vertical switch arm 42, oscillatably mounted upon a pivot 43 upon its upper end, the same extending from an insulated block 44 mounted upon the rear wall of the flatiron. The switch arm 42 carries a laterally extending contact finger 45 designed for engagement with a similar finger 46 rigidly secured to a block of insulating material 47 secured to the rear wall of the flatiron. It is to be noted that the pin 39 to which the upper end of the spring 38 is secured is in vertical alinement with the fulcrum 36 of said lever 35 for a purpose which will be presently obvious.

Mounted upon the slidably mounted rod 22 is the collar, 48 having formed upon one side an inwardly projecting finger 49, and a threaded opening formed in its opposite side to receive a set screw 50 utilizable also as a finger piece for shifting said collar along the rod. Mounted upon the outer end of the above mentioned lever 16 is an upwardly projecting pin 51 designed for engagement with the finger 49.

The contact members 42 and 46 are interposed in series with the circuit which supplies current to the heating element of the iron. In use, the set screw 50, the head of which projects through the slot 20, is unloosened so as to permit the collar to be adjusted along the rod 22, until located at a point formed upon the rear face of the casing 19 indicating the maximum temperature desired. When the iron is cold the outer end of the lever 16 is disposed toward the right hand side of the iron as shown in Fig. 1. As the iron becomes heated, the expansible element 12 (which normally is bent to substantially U-shaped formation) begins to straighten out and thereby carries the outer end of the lever 16 toward the opposite side of the iron until the pin 51 thereof engages the finger 49 of the collar 48. The rod 22 is then moved slightly toward the left, the motion of the rod being multiplied by the ratio of the arms 23 and 26, thereby rocking the bell crank to move the slotted bar 31 toward the left against the tension of the spring 32. The lever 35, which is normally held by the spring 38 in a manner to retain the contact fingers 45 and 46 in engagement, will now be urged toward the left until the said spring 38 moves beyond the vertical line passing through the fulcrum 36 of the lever and the pin 39, whereupon the lever 35 is quickly snapped over to the left thereby rapidly disengaging the contacts 45 and 46 so as to prevent the drawing of an arc, and the further supply of current to the iron is discontinued. The temperature of the iron will then fall, and the lever 16 will be again moved so as to dispose its outer end toward the right hand side of the iron. The pressure upon the finger 49 being relieved, the rod 22 is free to return to its former position under the influence of the spring 32 acting through the lever described above, whereupon the upper end of the lever 35 is again urged toward the right so as to cause the same to throw the contact members 45 and 46 forcibly into engagement and the circuit is again completed. In this manner the temperature of the iron may be regulated, and prevented from overheating. By adjusting the collar 48 along the rod 22 it will be obvious that the finger 49 thereof may be engaged earlier or later by the pin 51 of the lever 16 thereby cutting off the supply of current earlier or later as the case may be with the result that the maximum temperature of the iron may be varied at will.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. A temperature regulator for electric heating devices including an expansible element, a movable switch arm, means for rapidly moving the switch arm in one direction or the other, and an adjustable stop member engageable by the expansible member, and means movable by said stop member to initiate movement of the switch arm moving means.

2. A temperature regulator for electric heating devices including an expansible element, a slidably mounted rod, a stop member adjustably mounted on the rod, a movable switch arm, means operable by movement of the expansible element to engage the stop member to slide the bar, and means operable by movement of said rod to move the switch arm.

3. A temperature regulator for electric heating devices, including an expansible element, a slidably mounted rod, a stop member adjustable on the rod and engageable by the expansible member, a movable switch arm, means operable by sliding movement of the rod to throw the switch arm in one direction, when the stop is engaged by the expansible element, and resilient means for returning the switch arm to normal position when the expansible element contracts.

4. A temperature regulator for electric heating devices including a slidably mounted rod, a stop member adjustably mounted on the rod, a movable switch arm, a linkage connection between the slidable rod and the switch arm, an expansible element to engage, when expanded the stop member to move the rod and thereby throw the switch arm in one direction, and resilient means acting upon the linkage to return the switch arm to initial position when the expansible element contracts.

5. A temperature regulator for electric heating devices including a slidably mounted rod, a stop member adjustably mounted on the rod, a bell crank having one end connected to the rod, a movable switch arm operating means for the switch arm connected to the other arm of the bell crank, an expansible element operable, when expanded to engage the stop member to slide the rod whereby to throw the switch arm in one direction, and resilient means acting upon the bell crank to throw the switch, and resilient means acting upon the bell crank to throw the arm toward an initial position as the expansible element contracts.

6. A temperature regulator for electric heating devices including a slidably mounted rod, an adjustable stop member mounted thereon, a bell crank having one arm pivotally connected to the rod, a link pivotally connected to the other arm of said bell crank, a second bell crank having one arm pivotally connected to said link, a reciprocable bar pivotally connected at one end to the other arm of the second bell crank, said bar having a slot, a lever fulcrumed and having one end extended through the slot, a coil spring connected to the opposite end of the lever, the opposite end of the spring secured to a pin located in alinement with the fulcrum of the lever so as to move the lever quickly in one direction or the other as the spring passes over the fulcrum, a switch arm engageable by the opposite end of said lever, an expansible element, and a second lever pivotally connected at one end to the expansible element and having its other end movable to engage the stop element for the purpose described.

In testimony whereof I affix my signature in presence of two witnesses.

SHIRLEY L. GOLDSBROUGH.

Witnesses:
   LESTER A. SEARE,
   A. H. WETHEY, Jr.